US009963792B2

(12) United States Patent
Rheaume

(10) Patent No.: US 9,963,792 B2
(45) Date of Patent: May 8, 2018

(54) ELECTROCHEMICAL GAS SEPARATOR FOR COMBUSTION PREVENTION AND SUPPRESSION

(71) Applicant: Hamilton Sundstrand Corporation, Windsor Locks, CT (US)

(72) Inventor: Jonathan Rheaume, West Hartford, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 232 days.

(21) Appl. No.: 14/969,429

(22) Filed: Dec. 15, 2015

(65) Prior Publication Data

US 2017/0167037 A1 Jun. 15, 2017

(51) Int. Cl.

| | |
|---|---|
| ***C25B 9/00*** | (2006.01) |
| ***C25B 9/10*** | (2006.01) |
| ***C25B 1/10*** | (2006.01) |
| ***C25B 1/00*** | (2006.01) |
| ***C25B 13/04*** | (2006.01) |
| ***C25B 9/18*** | (2006.01) |
| ***B01D 53/32*** | (2006.01) |
| ***B64D 37/32*** | (2006.01) |

(52) U.S. Cl.

CPC .............. *C25B 9/10* (2013.01); *B01D 53/326* (2013.01); *B64D 37/32* (2013.01); *C25B 1/00* (2013.01); *C25B 1/10* (2013.01); *C25B 9/18* (2013.01); *C25B 13/04* (2013.01)

(58) Field of Classification Search

None

See application file for complete search history.

(56) References Cited

U.S. PATENT DOCUMENTS

| | | | | |
|---|---|---|---|---|
| 3,992,271 | A | 11/1976 | Danzig et al. | |
| 4,167,457 | A | 9/1979 | Giner | |
| 5,021,137 | A | 6/1991 | Joshi et al. | |
| 6,179,986 | B1 | 1/2001 | Swette et al. | |
| 7,694,916 | B2 | 4/2010 | Limaye et al. | |
| 8,568,934 | B2 | 10/2013 | Naeve et al. | |
| 2008/0282653 | A1 * | 11/2008 | Tempelman | A61G 11/00 55/385.2 |
| 2013/0200216 | A1 | 8/2013 | Mock et al. | |
| 2014/0087283 | A1 | 3/2014 | Stolte et al. | |
| 2015/0122814 | A1 | 5/2015 | Tichborne et al. | |

FOREIGN PATENT DOCUMENTS

| | | | |
|---|---|---|---|
| EP | 1902954 | A2 | 3/2008 |
| WO | WO2006058774 | A2 | 6/2006 |
| WO | 2013140312 | A2 | 9/2013 |

OTHER PUBLICATIONS

Extended European Search Report for EP Application No. 16202290.9, dated May 9, 2017, 8 Pages.

* cited by examiner

*Primary Examiner* — Arun S Phasge

(74) *Attorney, Agent, or Firm* — Kinney & Lange, P.A.

(57) ABSTRACT

An inert gas generating system includes an air source configured to provide an air stream that comprises at least one of ram air, external air, conditioned air, or compressed air. An electrochemical gas separator is configured to receive the air stream and to produce an oxygen-depleted air stream. A contained volume is configured to receive the oxygen-depleted air stream.

20 Claims, 3 Drawing Sheets

$H_2O$ from 28
38
27
26
10
16
26A
ANODE
CATHODE
26C
$H_2O$
26E
$O_2+H_2O$
ODA + $H_2O$
30
24
36
$H_2O$
22
32
28
34
$O_2$
$H_2O$ to 38
20T
20C
20
18
14
12

ELECTROCHEMICAL GAS SEPARATOR FOR COMBUSTION PREVENTION AND SUPPRESSION

BACKGROUND

Fuel tanks can contain potentially combustible combinations of oxygen, fuel vapors, and ignition sources. In order to prevent combustion in aircraft fuel tanks, aviation regulations require actively managing the ullage of fuel tanks, such that the oxygen partial pressure in the ullage is less than 12%. On-Board Inert Gas Generation Systems commonly use bleed air and pressurized hollow fiber membranes to produce ODA for fuel tank ullages. In hollow fiber membranes, the diffusivity of nitrogen is less than the diffusivity of oxygen and water vapor. Hollow fiber membrane systems require pressurized air to drive the separation of nitrogen from oxygen and water vapor in an air stream. However, the pressure of bleed air extracted from an aircraft engine compressor varies throughout a mission. Bleed air pressure can be lowest when the demand for inert gas is highest. During descent, outside air fills the ullage due to the pressure differential between the tank and ambient air. The operating setpoint of an aircraft engine is driven by pneumatic loads during descent so that the cabin pressurization, environmental control, wing de-icing, and inerting systems have sufficient bleed air pressure. Furthermore, aircraft design is trending toward lower pressure bleed systems and increasingly electric power distribution architectures. Accordingly, the use of high pressure, hollow fiber membrane inerting systems can be problematic for these systems.

Relatedly, fire suppression systems, such as those deployed in aircraft cargo holds, use halogenated chemicals to prevent combustion and/or fire. Halogenated fire suppression agents can be safe for human exposure; however, they are known to be detrimental to the Earth's atmospheric ozone layer. Hypoxic air can also be used for fire prevention and suppression. If people or animals are exposed to the hypoxic air, the partial pressure of oxygen must be closely regulated such that the gas prevents ignition and suppresses combustion while simultaneously remaining suitable for respiration.

SUMMARY

In one embodiment, an inert gas generating system includes an air source configured to provide an air stream that comprises at least one of ram air, external air, conditioned air, or compressed air. An electrochemical gas separator is configured to receive the air stream and to produce an oxygen-depleted air stream. A dryer is configured to receive the oxygen-depleted air stream and to produce a dehumidified oxygen-depleted air stream. A contained volume is configured to receive the dehumidified oxygen-depleted air stream.

In another embodiment, a method for generating inert gas includes feeding an air stream to an electrochemical gas separator, producing oxygen-depleted air by electrochemical gas separation, dehumidifying the oxygen-depleted air, and feeding the dehumidified oxygen-depleted air from the dryer to a contained volume. The air stream comprises at least one of ram air, external air, conditioned air, or compressed air.

In another embodiment, an inert gas generating system includes an air source configured to provide an air stream that comprises at least one of ram air, external air, conditioned air, or compressed air. An electrochemical gas separator is configured to receive the air stream and to produce an oxygen-depleted air stream. A contained volume is configured to receive the oxygen-depleted air stream.

DETAILED DESCRIPTION

The present disclosure relates to inert gas generating systems and methods of use thereof for generating oxygen-depleted air (ODA) from ram air, external air, conditioned air, or compressed air.

Figure 1:
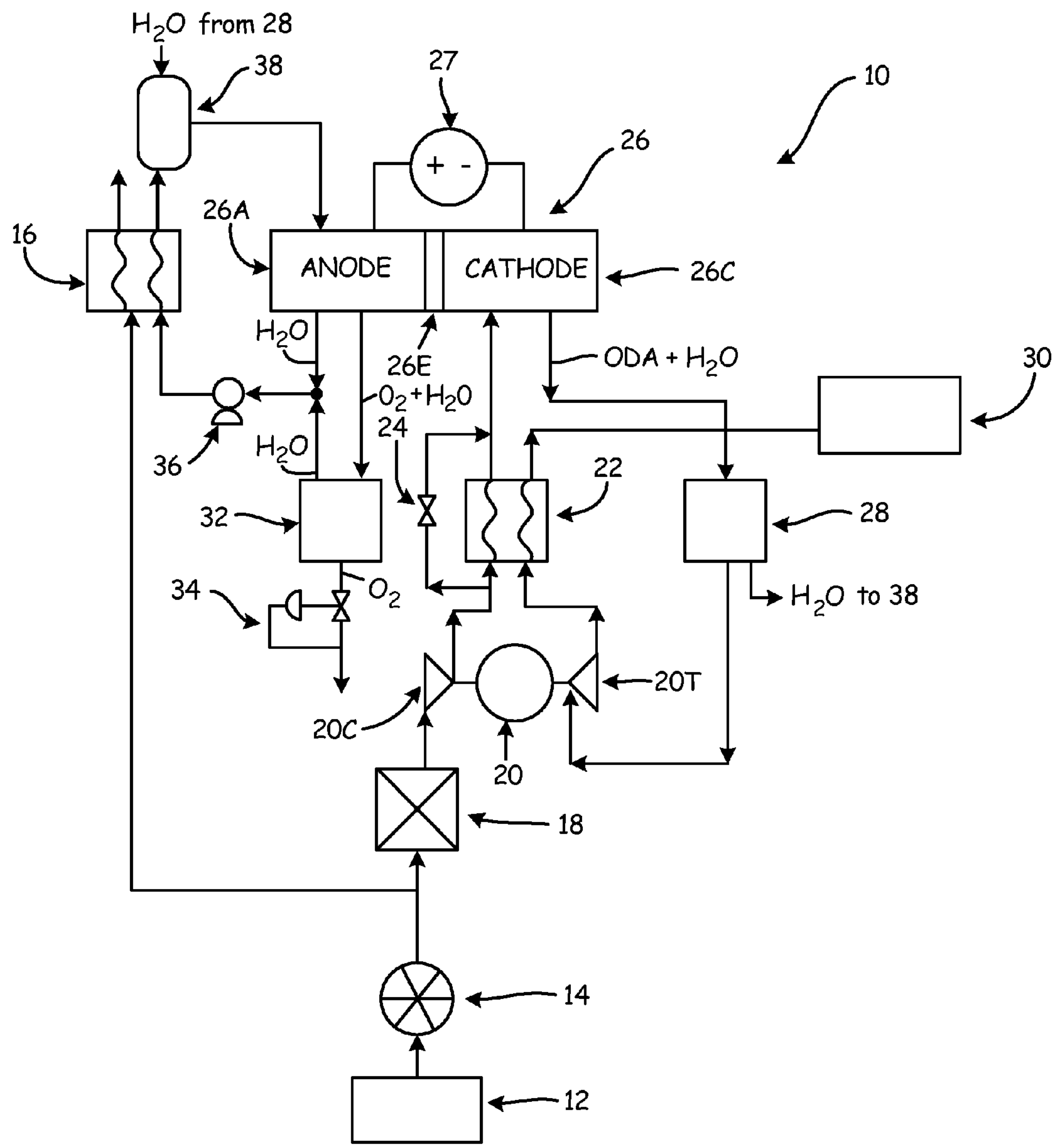
FIG. 1 is a schematic view of an inert gas generating system using ram air to produce oxygen-depleted air.

FIG. 1 is a schematic view of inert gas generating system (IGG) 10 using ram air to produce ODA. IGG 10 includes ram air source 12, ram air fan 14, electrochemical gas separator cooling unit (EGS cooling unit) 16, filter 18, motor-assisted turbocharger (MAT) 20 (which includes MAT compressor 20C and MAT turbine 20T), cathode air cooler 22, bypass valve 24, electrochemical gas separator (EGS) 26 (which includes EGS anode 26A, EGS cathode 26C, and EGS electrolyte 26E), electrical source 27, dryer 28, contained volume 30, water recovery unit 32, pressure regulator 34, pump 36, and water tank 38.

On the cathode side of IGG 10, ram air source 12 is connected to the inlet of ram air fan 14. The outlet of ram air fan 14 is connected to the inlet of filter 18. The outlet of filter 18 is connected to the inlet of MAT compressor 20C. The outlet of MAT compressor 20C is connected to the first inlet of cathode air cooler 22 and the inlet of bypass valve 24. The first outlet of cathode air cooler 22 and the outlet of bypass valve 24 converge upstream from the inlet of EGS cathode 26C. The inlet of EGS cathode 26C is connected to the convergence of the first outlet of cathode air cooler 22 and the outlet of bypass valve 24. The outlet of EGS cathode 26C is connected to the inlet of dryer 28. The outlet of dryer 28 is connected to the inlet of MAT turbine 20T. The outlet of MAT turbine 20T is connected to the second inlet of cathode air cooler 22. The second outlet of cathode air cooler 22 is connected to contained volume 30.

On the anode side of IGG 10, water tank 38 is connected to the inlet of EGS anode 26A. The first outlet of EGS anode 26A is connected to the inlet of water recovery unit 32. The first outlet of water recovery unit 32 is connected to inlet of pressure regulator 34. The second outlet of water recovery unit 32 and the second outlet of EGS anode 26A converge upstream from the inlet of pump 36. The inlet of pump 36 is connected to the convergence of the second outlet of water recovery unit 32 and the second outlet of EGS anode 26A. The outlet of pump 36 is connected to the first inlet of EGS cooling unit 16. The second inlet of EGS cooling unit 16 is connected to the outlet of ram air fan 14. The first outlet of EGS cooling unit 16 is connected to water tank 38.

IGG 10 generates ODA from ram air for inerting fuel tanks or for fire suppression. In order to generate ODA, EGS 26 removes oxygen from ram air entering EGS 26 at EGS cathode 26C. EGS 26 comprises EGS anode 26A, EGS cathode 26C, EGS electrolyte 26E, electrical source 27, and an electrical circuit. At anode 26A, water from water tank 38 is electrolyzed to produce electrons, hydrogen ions, and oxygen:

$$H_2O \rightarrow 2e^{+}2H^{+} + \frac{1}{2}O_2 \quad (1)$$

Reaction (1) produces an oxygen and water vapor stream and an unreacted water stream. Water recovery unit 32 receives the oxygen and water vapor stream produced by reaction (1) at anode 26A. Electrical source 27 imposes a bias voltage across EGS 26. This bias voltage induces a direct current through EGS 26. The electrical circuit of EGS 26 conducts the electrons produced by reaction (1) from anode 26A to cathode 26C. The hydrogen ions produced by reaction (1) migrate from anode 26A to cathode 26C across electrolyte 26E. At cathode 26C, oxygen from ram air reacts with the electrons and hydrogen ions to produce water:

$$\frac{1}{2}O_2 + 2e^{+}2H^{+} \rightarrow H_2O \quad (2)$$

Reaction (2) removes oxygen from ram air to produce an ODA stream that can contain water vapor and/or water. The water produced by reaction (2) at cathode 26 and/or the water entrained by the flow of ODA can be recycled or used for another purpose. EGS 26 is advantageous because it does not require high pressure air to generate an inert gas.

In one embodiment, electrolyte 26E can be a proton exchange membrane (PEM). Air entering EGS 26 using the PEM should be above the freezing and below boiling temperatures of water. In another other embodiment, EGS 26 can be preferentially located in the wing, wing box, or engine pylon of an aircraft. Proximity to an electric generator can reduce the length of the electric line required to power the device. Proximity to fuel tanks in the wing of an aircraft can reduce ODA conduit length, minimize system weight, and facilitate integration into the aircraft. Proximity to an engine can reduce oxygen-enriched air conduit length if it were to be consumed there.

On the cathode side of IGG 10, ram air fan 14 draws ram air from ram air source 12. When the aircraft is on the ground, ram air fan 14 is necessary to draw ram air from the surroundings. Filter 18 receives ram air from ram air fan 14 and removes pollutants, contaminants, impurities, particulates, or other undesirable chemicals from ram air prior to entering EGS 26. Other embodiments of filter 18 can include, but are not limited to, a purifier, a scrubber, and/or an absorber. MAT compressor 20C can receive and pressurize ram air from filter 18.

Cathode air cooler 22 and bypass valve 24 are configured to receive ram air from MAT compressor 20C. Bypass valve 24 has an inlet before and an outlet after cathode air cooler 22. Cathode air cooler 22 and bypass valve 24 permit temperature control of ram air entering EGS cathode 26C. In one embodiment, ram air can be unsuitably hot and require cooling from cathode air cooler 22 before flowing to EGS cathode 26C. In another embodiment, ram air may be an appropriate temperature and bypass cathode air cooler 22 to EGS cathode 26C. In another embodiment, ram air can divided in part through bypass valve 24 and cooled in part by cathode air cooler 22.

Cathode 26C receives ram air from at least one of cathode air cooler 22 or bypass valve 24. Cathode 26C produces ODA according to reaction (2). Dryer 28 receives and dehumidifies ODA exiting cathode 26C.

MAT turbine 20T receives and expands ODA exiting dryer 28 to drive a shaft shared by compressor 20C. MAT 20 is advantageous because compressor 20C can pressurize ram air from filter 18 as turbine 20T recuperates work from ODA received from dryer 28. In other embodiments, the pressurization source can be integrated with other air handling equipment such as a cabin air compressor or an environmental control system pack. Contained volume 30 receives ODA from turbine 20T. In one embodiment, contained volume 30 can be a fuel tank. In another embodiment, contained volume 30 can be a cargo hold. In another embodiment, contained volume 30 can be an engine compartment. In another embodiment, contained volume 30 can be a utility workspace. In another embodiment, contained volume 30 can be a bay or a chase. In another embodiment, contained volume 30 can be a data center. In another embodiment, contained volume 30 can be a warehouse.

On the anode side of IGG 10, water is provided to EGS anode 26A and recycled. Anode 26A receives water from water tank 38. Anode 26A electrolyzes water from water tank 38 according to reaction (1) to produce oxygen. The oxygen stream exiting anode 26A can contain water vapor. Water recovery unit 32 receives and recovers water from the oxygen stream exiting anode 26A. Pressure regulator 34 receives the oxygen stream from water recovery unit 32. Pump 36 pumps water from EGS anode 26A and water recovery unit 32 to EGS cooling unit 16. EGS cooling unit 16 receives ram air from ram air fan 14 and water from pump 36. Water tank 38 receives water from EGS cooling unit 16. Water tank 38 can also be configured to receive water from dryer 28. In another embodiment, water tank 38 can be configured to receive purified makeup water to replace water lost as humidity and/or from leaks. In another embodiment, purified makeup water can be distilled water or water purified by a purification device such as a reverse osmosis filtration system with activated charcoal stages. The ram air exiting EGS cooling unit 16 can be exhausted overboard or used for another purpose.

IGG 10 enables the use of lower pressure bleed systems and increasingly electric aircraft architectures because the operation of EGS 26 does not require a pressure gradient across electrolyte 26E. Also, the system of IGG 10 is advantageous in that it allows the use of ram air for inert gas generating at different ram air conditions. Ram air properties vary depending on the flight phase. On the ground, ram air tends to be warmer and denser than at cruising altitude. At cruising altitude, ram air may be too cold to feed directly to EGS 26. MAT 20, bypass valve 24, and cathode air cooler 22 can regulate pressure and temperature of ram air to desired conditions. Furthermore, filter 18 removes impurities to provide a longer service life for the electrodes of ECS 26. The ODA generated by IGG 10 can also serve as a benign alternative to ozone-depleting halogenated compounds used in fire suppression systems.

Figure 2:
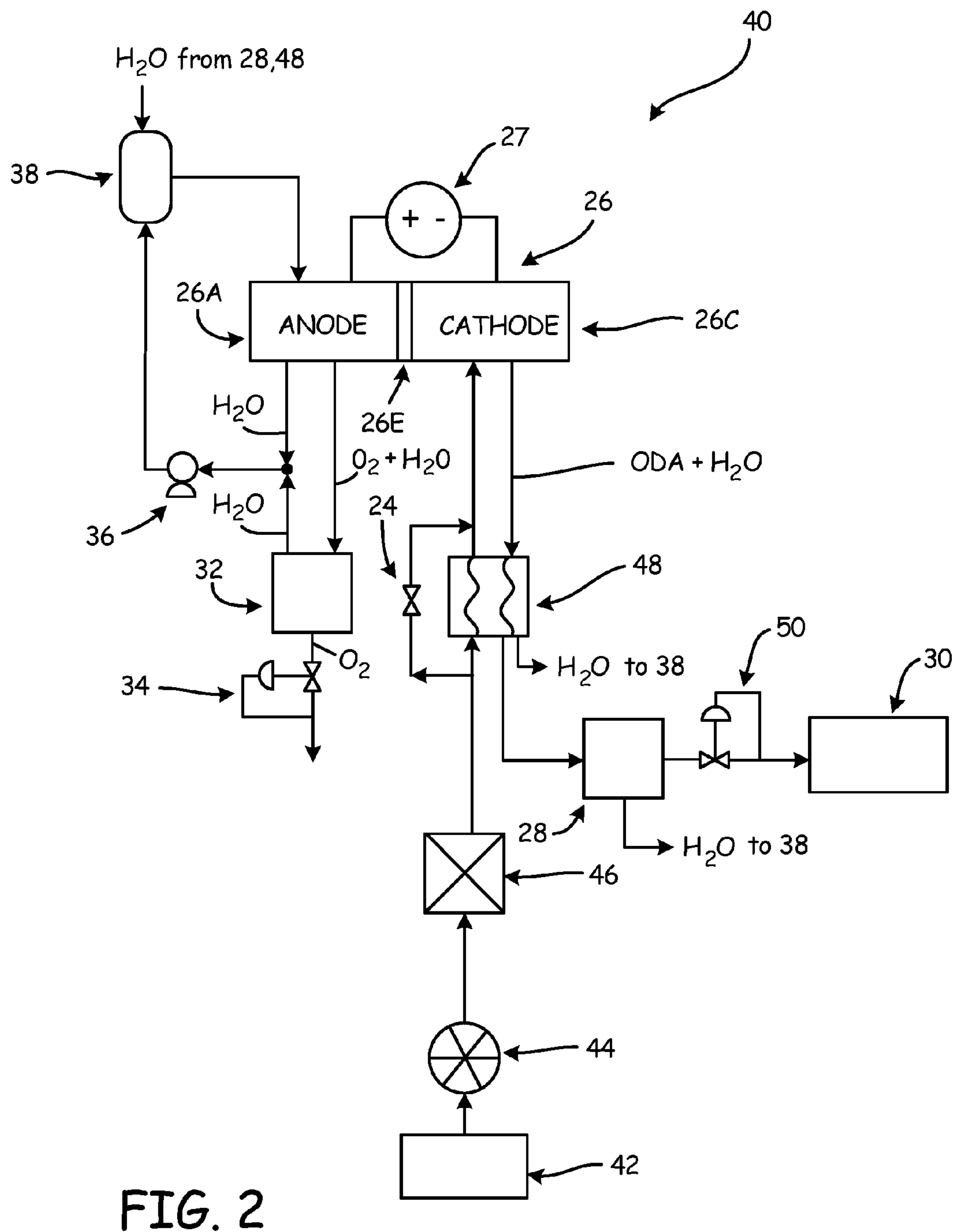
FIG. 2 is a schematic view of an inert gas generating system using conditioned air to produce oxygen-depleted air.

FIG. 2 is a schematic view of inert gas generating system (IGG) 40 using conditioned air to produce ODA. Conditioned air can comprise, but is not limited to, air from an environmental control system, cabin air, or flight deck air. IGG 40 includes conditioned air source 42, fan 44, filter 46, cathode heat recovery heat exchanger 48, bypass valve 24, EGS 26 (which includes EGS anode 26A, EGS cathode 26C, and EGS electrolyte 26E), electrical source 27, dryer 28, ODA pressure regulator 50, contained volume 30, water recovery unit 32, pressure regulator 34, pump 36, and water tank 38.

On the cathode side of IGG 40, conditioned air source 42 is connected to the inlet of fan 44. The outlet of fan 44 is connected to the inlet of filter 46. The outlet of filter 46 is connected to the first inlet of cathode heat recovery heat exchanger 48 and the inlet of bypass valve 24. The first outlet of cathode heat recovery heat exchanger 48 and the outlet of bypass valve 24 converge upstream from the inlet of cathode 26C. The inlet of EGS cathode 26C is connected to the convergence of the first outlet of cathode heat recovery heat exchanger 48 and the outlet of bypass valve 24. The outlet of cathode 26C is connected to the second inlet of cathode heat recovery heat exchanger 48. The second outlet of cathode heat recovery heat exchanger 48 is connected to the inlet of dryer 28. The outlet of dryer 28 is connected to the inlet ODA pressure regulator 50. The outlet of ODA pressure regulator 50 is connected to the inlet of contained volume 30.

On the anode side of IGG 40, water tank 38 is connected to the inlet of anode 26A. The first outlet of anode 26A is connected to the inlet of water recovery unit 32. The first outlet of water recovery unit 32 is connected to inlet of pressure regulator 34. The second outlet of water recovery unit 32 and the second outlet of anode 26A converge upstream of pump 36. The inlet of pump 36 is connected to the convergence of the second outlet of water recovery unit 32 and the second outlet of anode 26A. The outlet of pump 36 is connected to water tank 38.

IGG 40 generates ODA from conditioned air for inerting fuel tanks or for fire suppression. On the cathode side of IGG 40, fan 44 draws conditioned air from conditioned air source 42. Filter 46 receives conditioned air from fan 44. Filter 46 removes pollutants, contaminants, impurities, particulates, or other undesirable chemicals from ram air prior to entering EGS 26. Other embodiments of filter 46 can include, but are not limited to, a purifier, a scrubber, and/or an absorber.

Cathode heat recovery heat exchanger 48 and bypass valve 24 are configured to receive conditioned air from filter 46. Bypass valve 24 has an inlet before and an outlet after cathode heat recovery heat exchanger 48. Cathode heat recovery heat exchanger 48 and bypass valve 24 permit temperature control of conditioned air entering cathode 26C.

Cathode 26C receives conditioned air from at least one of cathode heat recovery heat exchanger 48 or bypass valve 24. Cathode 26C removes oxygen from conditioned ram air to producing ODA according to reaction (2).

Cathode heat recovery heat exchanger 48 condenses water from the ODA exiting cathode 26C. The water condensed by cathode heat recovery heat exchanger 48 can be recirculated to water tank 38 or used for another purpose. Dryer 28 receives and dehumidifies the ODA exiting cathode heat recovery heat exchanger 48 before it is received by contained volume 30. ODA pressure regulator 50 receives ODA from dryer 28. ODA pressure regulator 50 controls the pressure of ODA entering contained volume 30. Contained volume 30 receives ODA from ODA pressure regulator 50.

On the anode side of IGG 40, water is provided to anode 26A and recycled. Anode 26A receives water from water tank 38. Anode 26A electrolyzes water from water tank 38 according to reaction (1) to produce oxygen. The oxygen stream exiting anode 26A can contain water vapor. Water recovery unit 32 receives and recovers water from the oxygen stream exiting EGS anode 26A. Pressure regulator 34 receives the oxygen stream from water recovery unit 32. Pump 36 pumps water from anode 26A and water recovery unit 32 to water tank 38. Water tank 38 can also be configured to receive water from dryer 28 and cathode heat recovery heat exchanger 48. In another embodiment, water tank 38 can be configured to receive purified makeup water to replace water lost as humidity and/or from leaks.

IGG 40 enables the use of lower pressure bleed systems and increasingly electric aircraft architectures because the operation of EGS 26 does not require a pressure gradient across electrolyte 26E. Furthermore, cathode heat recovery heat exchanger 48 and bypass valve 24 permit temperature control of conditioned air entering IGG 40 at different conditions. The ODA generated by IGG 40 can also serve as a benign alternative to ozone-depleting halogenated compounds used in fire suppression systems for aircraft cargo holds.

Figure 3:
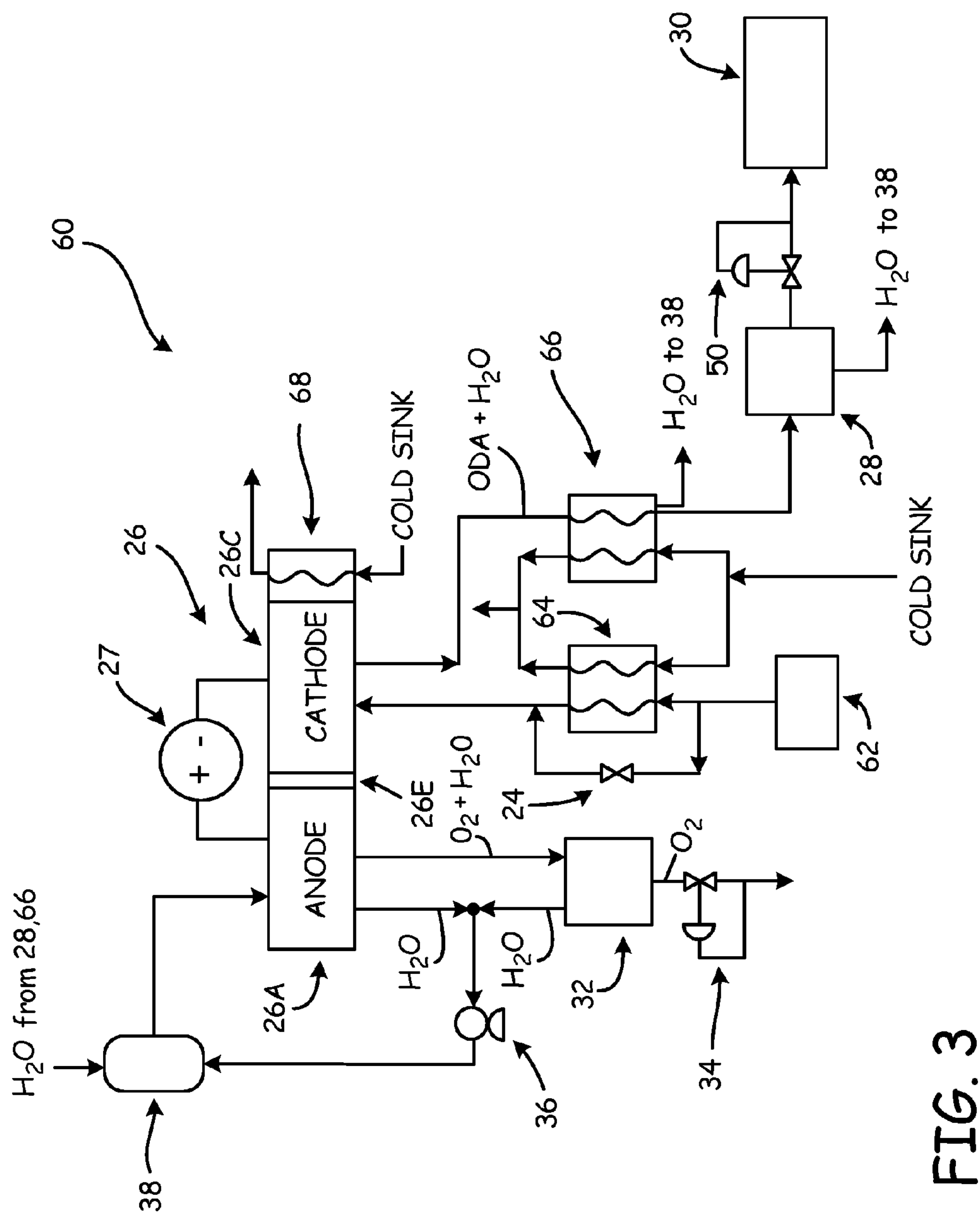
FIG. 3 is a schematic view of an inert gas generating system using compressed air to produce oxygen-depleted air.

FIG. 3 is a schematic view of an inert gas generating system 60 using compressed air to produce ODA. Compressed air can comprise, but is not limited to, engine bleed air or air pressurized by a load compressor driven by an auxiliary power unit or by an electric motor. IGG 60 includes compressed air source 62, heat exchanger 64, bypass valve 24, EGS 26 (which includes EGS anode 26A, EGS cathode 26C, and EGS electrolyte 26E), electrical source 27, cathode exhaust condenser 66, dryer 28, ODA pressure regulator 50, stack cooler 68, contained volume 30, water recovery unit 32, pressure regulator 34, pump 36, and water tank 38.

On the cathode side of IGG 60, compressed air source 62 is connected to the first inlet of heat exchanger 64 and the inlet of bypass valve 24. The first outlet of heat exchanger 64 and the outlet of bypass valve 24 converge upstream from the inlet of cathode 26C. The inlet of cathode 26C is connected to the convergence of the first outlet of heat exchanger 64 and the outlet of bypass valve 24. The outlet of cathode 26C is connected to an inlet of cathode exhaust condenser 66. The outlet of cathode exhaust condenser 66 is connected to an inlet of dryer 28. The outlet of dryer 28 is connected to the inlet ODA pressure regulator 50. The outlet of ODA pressure regulator 50 is connected to the inlet of contained volume 30. The second inlets of both heat exchanger 64 and cathode exhaust condenser 66 are connected to cold sink flow. Stack cooler 68 is also connected to cold sink flow.

On the anode side of IGG 60, water tank 38 is connected to the inlet of anode 26A. The first outlet of anode 26A is connected to the inlet of water recovery unit 32. The first outlet of water recovery unit 32 is connected to inlet of pressure regulator 34. The second outlet of water recovery unit 32 and the second outlet of anode 26A converge upstream from the inlet of pump 36. The inlet of pump 36 is connected to the convergence of the second outlet of water recovery unit 32 and the second outlet of anode 26A. The outlet of pump 36 is connected to water tank 38.

IGG 60 generates ODA from compressed air for inerting fuel tanks or for fire suppression. On the cathode side of IGG 60, heat exchanger 64 and bypass valve 24 are configured to receive compressed air from compressed air source 62. Bypass valve 24 has an inlet before and an outlet after heat exchanger 64. Heat exchanger 64 and bypass valve 24 permit temperature control of compressed air entering cathode 26C. In another embodiment, IGG 60 can further comprise a filter to remove pollutants, contaminants, impurities, particulates, or other undesirable chemicals from ram air prior to entering EGS 26. Other embodiments of a filter can include, but are not limited to, a purifier, a scrubber, and/or an absorber.

Cathode 26C receives compressed air from at least one of heat exchanger 64 or bypass valve 24. Cathode 26C removes oxygen from compressed ram air to produce ODA according to reaction (2). Cathode exhaust condenser 66 receives and removes water from ODA exiting cathode 26C. Dryer 28 receives ODA from cathode exhaust condenser 66. The water recovered from cathode exhaust condenser 66 or dryer 28 can be recycled to water tank 38. ODA pressure regulator 50 receives ODA from dryer 28. ODA pressure regulator 50 controls the pressure of ODA entering contained volume 30. Contained volume 30 receives ODA from ODA pressure regulator 50. Stack cooler 68 cools EGS 26 using cold sink flow. Cold sink flow cools both heat exchanger 64 and cathode exhaust condenser 66.

On the anode side of IGG 60, water is provided to anode 26A and recycled. Anode 26A receives water from water tank 38. Anode 26A electrolyzes water from water tank 38 according to reaction (1) to produce oxygen. The oxygen stream exiting anode 26A can contain water vapor. Water recovery unit 32 receives and recovers water from the oxygen stream exiting anode 26A. Pressure regulator 34 receives the oxygen stream from water recovery unit 32. Pump 36 pumps water from anode 26A and water recovery unit 32 to water tank 38. Water tank 38 can also be configured to receive water from dryer 28 and cathode exhaust condenser 66. In another embodiment, 38 can be configured to receive purified makeup water to replace water lost as humidity and/or from leaks.

The compressed air stream of IGG 60 enables a more compact EGS 26 because flow passages and electrodes can be made smaller for equivalent flows. A smaller and lighter EGS 26 can require less catalyst loading, reducing design and/or operation costs. The ODA generated by IGG 60 can also serve as a benign alternative to ozone-depleting halogenated compounds used in fire suppression systems.

In another embodiment, the oxygen from anode 26A can be used in the cabin or flight deck or combusted in an engine. In another embodiment, an auxiliary power unit can receive the oxygen from anode 26A for combustion. Additional oxygen fed to the auxiliary power system can also assist with cold-starting the auxiliary power unit. In another embodiment, IGG 10, 40, or 60 can include a mechanical pump and pressure regulator for pressurizing water from the anode of electrochemical gas separator. In another embodiment, EGS 26 can include a stack of one or more cells (a cell includes an anode, an electrolyte, and a cathode) separated by interconnectors and capped with end plates that contain electrical connections to one or more electrical sources. In another embodiment, EGS 26 can include a plurality of stacks. The electrical power source applies a potential difference (bias voltage) across the stack (or stacks) in order to induce direct current to drive the electrochemical oxidation and reduction reactions. In another embodiment, IGG 10, 40, or 60 can include a compressor or blower to pressurize an air stream. In another embodiment, IGG 10, 40, or 60 can include a purification device to purify makeup water.

Discussion of Possible Embodiments

The following are non-exclusive descriptions of possible embodiments of the present invention.

An inert gas generating system according to an exemplary embodiment of this disclosure, among other possible things includes an air source configured to provide an air stream that comprises at least one of ram air, external air, conditioned air, or compressed air. An electrochemical gas separator is configured to receive the air stream and to produce an oxygen-depleted air stream. A dryer is configured to receive the oxygen-depleted air stream and to produce a dehumidified oxygen-depleted air stream. A contained volume is configured to receive the dehumidified oxygen-depleted air stream.

The inert gas generating system of the preceding paragraph can optionally include, additionally and/or alternatively, any one or more of the following features, configurations and/or additional components.

The electrochemical gas separator comprises a cathode and an anode.

The electrochemical gas separator comprises a proton exchange membrane.

A filter is configured to receive the air stream upstream of the electrochemical gas separator and to produce a filtered air stream.

The contained volume is a fuel tank.

The contained volume is one of a one of a cargo hold, an engine compartment, a utility workspace, a bay, a chase, a data center, or a warehouse.

The electrochemical gas separator comprises an electrical source.

The electrochemical gas separator comprises a stack of cells

A method for generating inert gas according to an exemplary embodiment of this disclosure, among other possible things includes feeding an air stream to an electrochemical gas separator, producing oxygen-depleted air by electrochemical gas separation, dehumidifying the oxygen-depleted air, and feeding the dehumidified oxygen-depleted air from the dryer to a fuel tank. The air stream comprises at least one of ram air, external air, conditioned air, or compressed air.

The method for generating inert gas of the preceding paragraph can optionally include, additionally and/or alternatively, any one or more of the following features, configurations and/or additional components:

The method comprises filtering the air stream prior to producing oxygen-depleted air.

The method comprises applying a bias voltage across the electrochemical gas separator.

An inert gas generating system according to an exemplary embodiment of this disclosure, among other possible things includes an air source configured to provide an air stream that comprises at least one of ram air, external air, conditioned air, or compressed air. An electrochemical gas separator is configured to receive the air stream and to produce an oxygen-depleted air stream. A contained volume is configured to receive the oxygen-depleted air stream.

The inert gas generating system of the preceding paragraph can optionally include, additionally and/or alternatively, any one or more of the following features, configurations and/or additional components.

A dryer is configured to receive the oxygen-depleted air stream and to produce a dehumidified oxygen-depleted air stream.

The electrochemical gas separator comprises a cathode and an anode.

The electrochemical gas separator comprises an electrolyte.

The electrolyte is a proton exchange membrane.

An electrical source is connected to the electrochemical gas separator.

The electrical source powers the electrochemical gas separator.

The contained volume is a fuel tank.

The contained volume is one of a cargo hold, an engine compartment, a utility workspace, a bay, a chase, a data center, or a warehouse.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An inert gas generating system comprising:

an air source configured to provide an air stream that comprises at least one of ram air, external air, conditioned air, or compressed air;

an electrochemical gas separator configured to receive the air stream and an electrical current to produce an oxygen-depleted air stream;

a dryer configured to receive the oxygen-depleted air stream and to produce a dehumidified oxygen-depleted air stream with no more than 12% oxygen content; and a contained volume configured to receive the dehumidified oxygen-depleted air stream.

2. The inert gas generating system of claim 1, wherein the electrochemical gas separator further comprises a cathode and an anode.

3. The inert gas generating system of claim 2, wherein the electrochemical gas separator further comprises a proton exchange membrane.

4. The inert gas generating system of claim 1, further comprising a filter configured to receive the air stream upstream of the electrochemical gas separator and to produce a filtered air stream.

5. The inert gas generating system of claim 1, wherein the contained volume further is a fuel tank.

6. The inert gas generating system of claim 1, wherein the contained volume comprises one of a cargo hold, an engine compartment, a utility workspace, a bay, a chase, a data center, or a warehouse.

7. The inert gas generating system of claim 1, wherein the electrochemical gas separator further comprises a stack of cells.

8. The inert gas generating system of claim 1, further comprising an electrical source.

9. A method for generating inert gas, the method comprising:

feeding an air stream that comprises at least one of ram air, external air, conditioned air, or compressed air to an electrochemical gas separator;

applying a bias voltage across the electrochemical gas separator;

producing oxygen-depleted air with no more than 12% oxygen content by electrochemical gas separation;

dehumidifying the oxygen-depleted air; and feeding the dehumidified oxygen-depleted air from the dryer to a contained volume.

10. The method of claim 9, further comprising filtering the air stream prior to producing oxygen-depleted air.

11. The method of claim 9, further comprising applying a bias voltage across the electrochemical gas separator.

12. An inert gas generating system comprising:

an air source configured to provide an air stream that comprises at least one of ram air, external air, conditioned air, or compressed air;

an electrochemical gas separator configured to receive the air stream and an electrical current to produce an oxygen-depleted air stream with no more than 12% oxygen content;

a contained volume configured to receive the oxygen-depleted air stream.

13. The inert gas generating system of claim 12, further comprising a dryer configured to receive the oxygen-depleted air stream and to produce a dehumidified oxygen-depleted air stream.

14. The inert gas generating system of claim 13, wherein the electrochemical gas separator further comprises a cathode and an anode.

15. The inert gas generating system of claim 14, wherein the electrochemical gas separator further comprises an electrolyte.

16. The inert gas generating system of claim 15, wherein the electrolyte is a proton exchange membrane.

17. The inert gas generating system of claim 16, further comprising an electrical source connected to the electrochemical gas separator.

18. The inert gas generating system of claim 17, wherein the electrical source powers the electrochemical gas separator.

19. The inert gas generating system of claim 18, wherein the contained volume is a fuel tank.

20. The inert gas generating system of claim 18, wherein the contained volume comprises one of a cargo hold, an engine compartment, a utility workspace, a bay, a chase, a data center, or a warehouse.

* * * * *